United States Patent
Chung

(10) Patent No.: US 7,318,665 B2
(45) Date of Patent: Jan. 15, 2008

(54) CORNER ENHANCING DEVICE FOR LIGHT GUIDE PLATE OF BACKLIGHT MODULE

(75) Inventor: Cheng-Fa Chung, Kaohsiung Hsien (TW)

(73) Assignee: Radiant Opto-Electronics Corp., Kaohsiung (TW)

( * ) Notice: Subject to any disclaimer, the term of this patent is extended or adjusted under 35 U.S.C. 154(b) by 113 days.

(21) Appl. No.: 11/104,471

(22) Filed: Apr. 13, 2005

(65) Prior Publication Data
US 2006/0232994 A1 Oct. 19, 2006

(51) Int. Cl.
*F21V 7/04* (2006.01)

(52) U.S. Cl. ............. 362/607; 362/600; 362/601; 362/606; 362/608; 362/609; 362/621; 362/623

(58) Field of Classification Search .............. 362/600, 362/601, 606–609, 621–623
See application file for complete search history.

(56) References Cited

U.S. PATENT DOCUMENTS

| 5,560,698 A * | 10/1996 | Okano | 362/609 |
| 7,056,003 B2 * | 6/2006 | Mai | 362/609 |
| 2004/0141307 A1 * | 7/2004 | Mai | 362/31 |

* cited by examiner

*Primary Examiner*—Stephen F. Husar
*Assistant Examiner*—Meghan K. Dunwiddie
(74) *Attorney, Agent, or Firm*—Leong C. Lei

(57) ABSTRACT

A light guiding device to compensate insufficient lighting in a light guide plate's corner areas is provided. The light guiding device is positioned on the inner side of the lamp reflector neighboring to the electrodes at the ends of the lamp. The light guiding device has a reflection surface which reflects and directs lights toward the dim corner areas of the light guide plate, compensating the lighting and thereby reducing these dim areas.

2 Claims, 6 Drawing Sheets

CORNER ENHANCING DEVICE FOR LIGHT GUIDE PLATE OF BACKLIGHT MODULE

BACKGROUND OF THE INVENTION (a) Technical Field of the Invention

The present invention generally relates to backlight modules, and more particularly to a backlight module using light guiding devices in its lamp reflector to compensate insufficient lighting in the corner areas of its light guide plate.

(b) Description of the Prior Art

A typical liquid crystal display (LCD) device usually adopts a planar light source provided by a backlight module.

As illustrated in FIG. 1, the backlight module 1 is mainly composed of a light guide plate 11, a reflection plate 12, a number of diffusion films 13 and prism sheets 14, and a lamp 15. The light guide plate 111 has a light exiting side 111, a reflection side 112 opposite to the light exiting side 111, and at least a light entering side 113 at the flank. The reflection plate 12 is attached to the reflection side 112 of the light guide plate 11, and the surface of the reflection side 112 is densely dispersed with light guiding dots 114. The diffusion films 13 and prism sheets 14, on the other hand, are attached to the light exiting side 111 of the light guide plate 11. The cold cathode fluorescent lamp (CCFL) 15 is arranged along the light entering side 113 and is wrapped almost completely inside a lamp reflector 16.

As shown in FIG. 2, lights emitted from the lamp 15 enters directly, or after being reflected by the lamp reflector 16, into the light guide plate 11 via its light entering side 113. The lights are then guided by the refraction and reflection effects of the light guiding dots 114 and the reflection plate 12 to emit from the light guide plate 11 via its light exiting side 111. The lights are then Further evenly distributed and focused by the diffusion films 13 and the prism sheets 14, so as to achieve a uniform planar backlight.

To enhance the LCD's lighting efficiency, quite a few designs have already been disclosed in the past regarding, for example, the form factor of the light guide plate 11, the shape and distribution of the light guiding dots 114, etc. There are also teachings about the design of the lamp 15 and the lamp reflector 16 that can be applied to various types of backlight modules.

According to the foregoing description, the lamp 15 is the only self-luminous device in the backlight module 1. At the two ends of the lamp 15's tubular body 151 are the electrodes 152 for the conduction of electricity. The electrodes 152 themselves do not emit lights and the lights emitted from the tubular body 151 are also weaker towards the two electrodes 152, as illustrated in FIG. 3.

As also shown in FIG. 4, when there are two opposite lamps 15 arranged at two light entering sides 113, due to the non-uniform distribution of luminance along the lamps 15's tubular bodies 151, there are dim areas 115 at the four corners of the light guide plate 11, which reduces the usability of the backlight module 1 significantly.

Such an undesirable effect would become even more disturbing as the dimension of the backlight module is increased for use in a large-scale display. The dim corner areas of the light guide plate in effect reduce the viewing region of the display significantly.

SUMMARY OF THE INVENTION

The primary purpose of the present invention is to provide a means for compensating the insufficient lighting in the corner areas of a light guide plate. To achieve the foregoing objective, the present invention installs light guiding devices at the bottom on the inner side of the lamp reflector neighboring to the electrodes at the ends of the lamp. The light guiding device has a reflection surface which would reflect and direct lights toward the dim corner areas of the light guide plate, compensating the lighting and thereby reducing these dim areas. The light guide plate is therefore able to function as a more uniform planar light source.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

In the following, detailed description along with the accompanied drawings is given to better explain preferred embodiments of the present invention.

Figure 1:
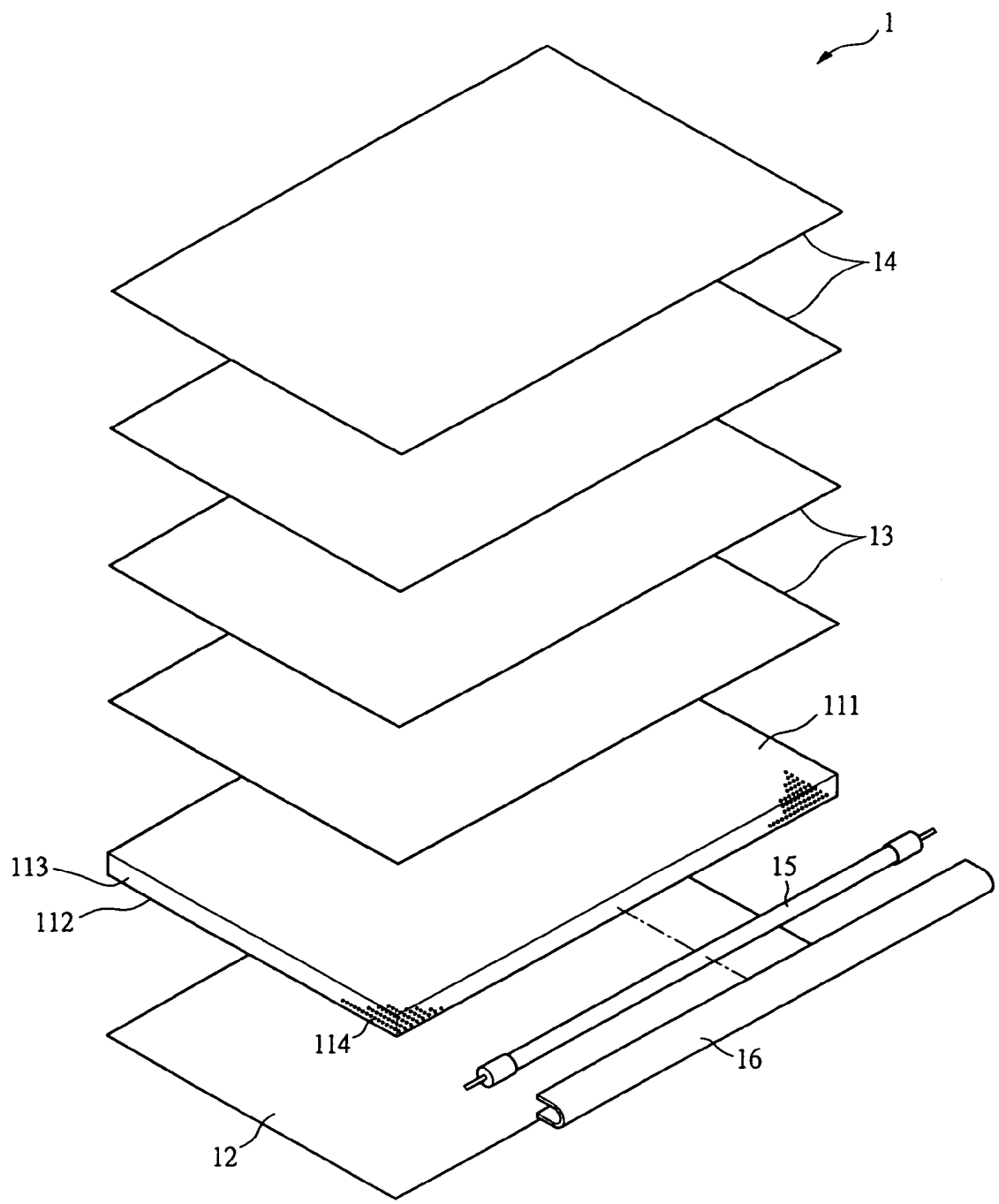
FIG. 1 is a perspective explosion view showing a conventional backlight module.
Figure 2:
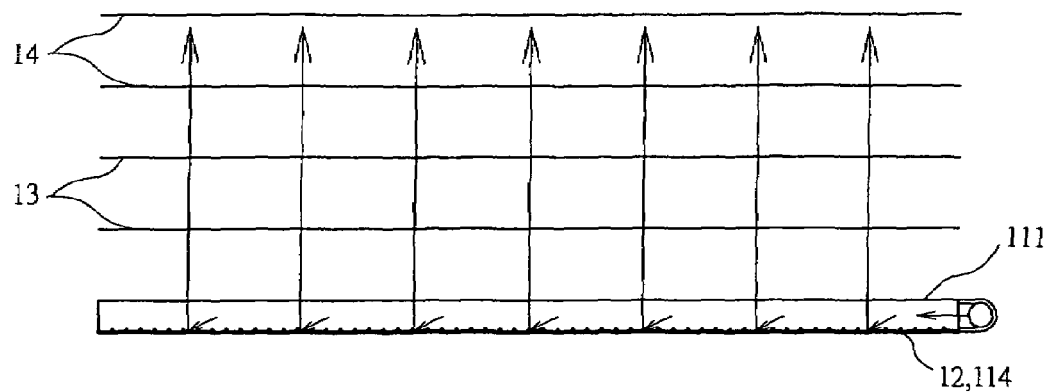
FIG. 2 is a schematic side view showing the trajectories of lights of a conventional backlight module.
Figure 3:
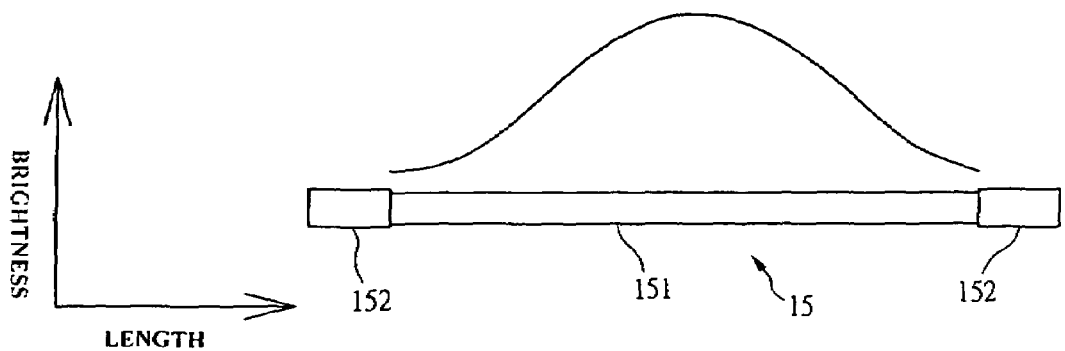
FIG. 3 is a schematic view showing the luminance distribution along the tubular lamp of a conventional backlight module.
Figure 4:
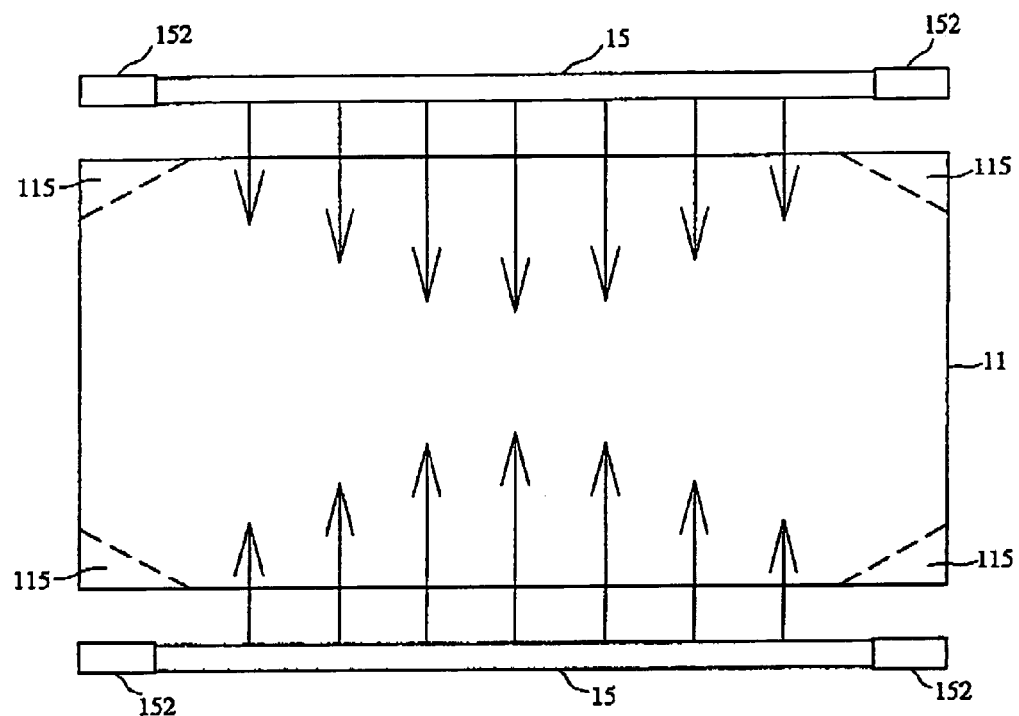
FIG. 4 is a schematic top view showing the trajectories of lights emitted into the light guide plate of a conventional backlight module.
Figure 5:
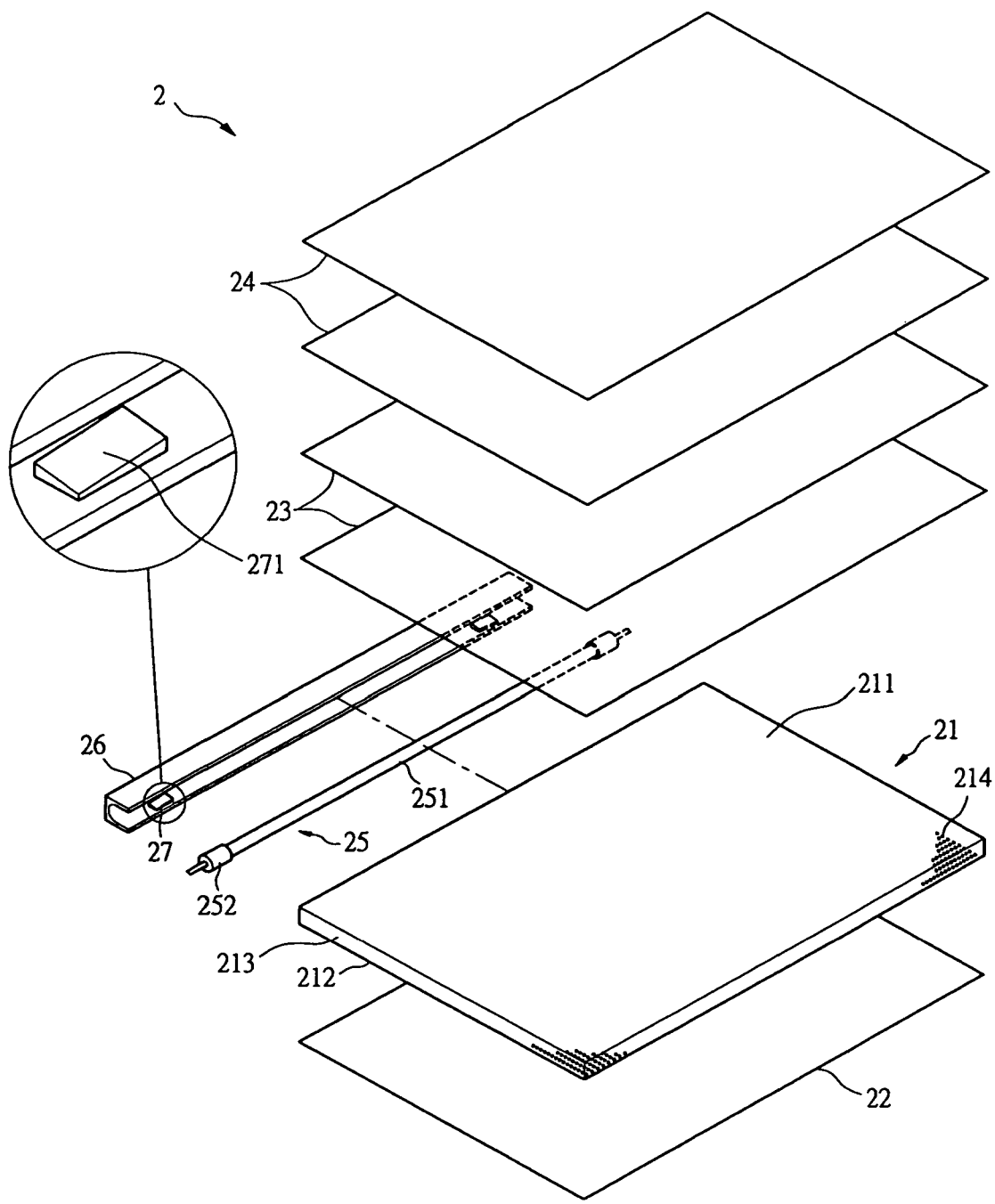
FIG. 5 is a perspective explosion view showing a backlight module according to a first embodiment of the present invention.
Figure 6:
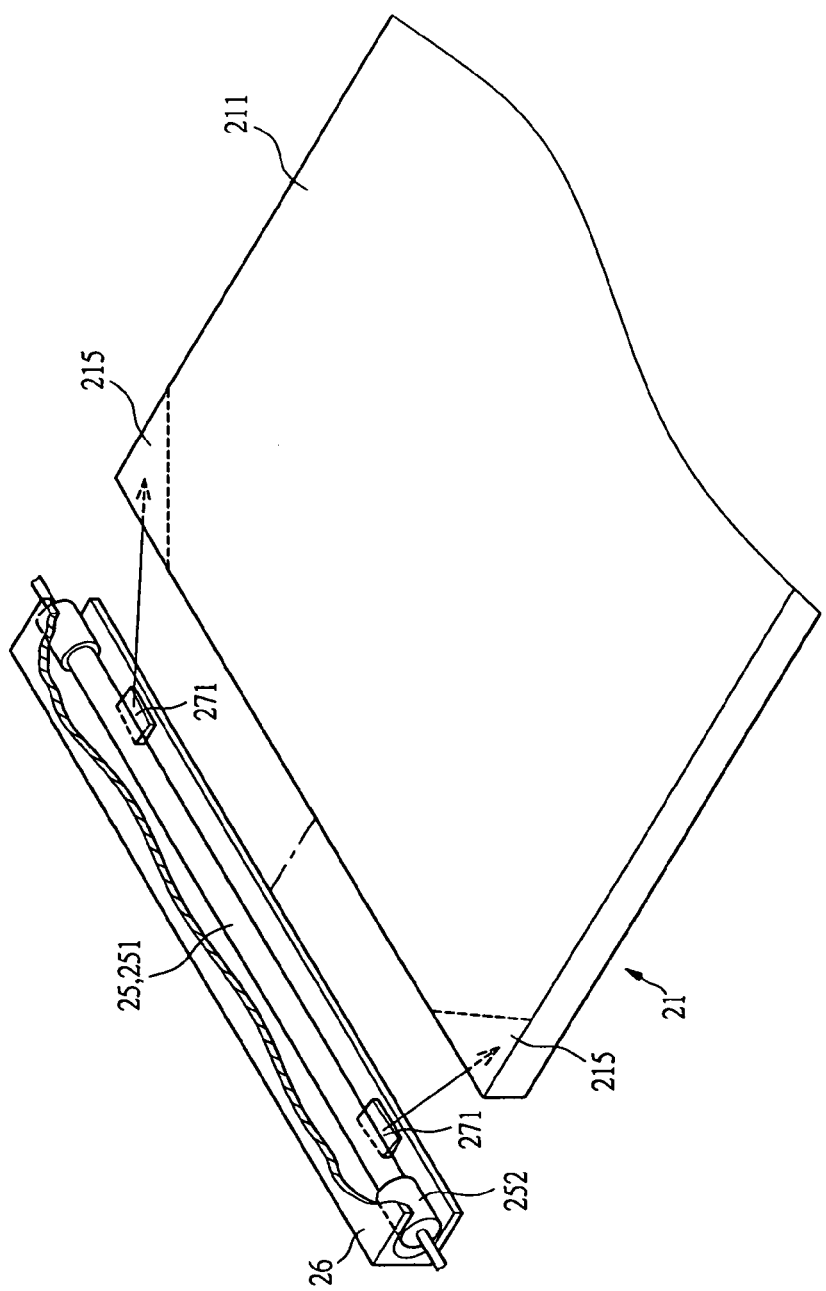
FIG. 6 is a perspective view showing the trajectories of lights reflected from the light guiding devices of a backlight module according to a first embodiment of the present invention.
Figure 7:
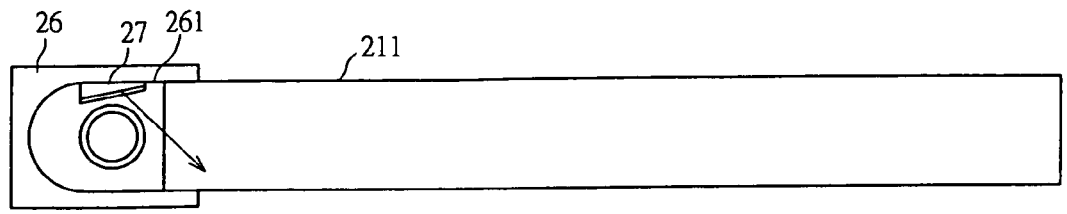
FIG. 7 is a schematic side view showing a second embodiment of the present invention.
Figure 8:
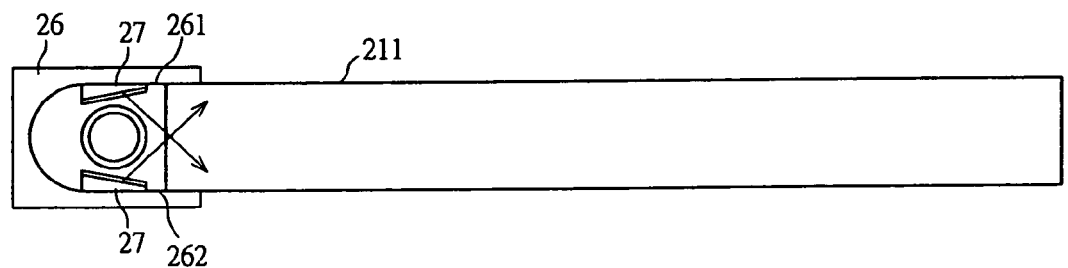
FIG. 8 is a schematic side view showing a third embodiment of the present invention.

As illustrated in FIG. 5, the backlight module 2 of the present embodiment is mainly composed of a light guide plate 21, a reflection plate 22, at least a diffusion film 23 and at least a prism sheet 24, and a cold cathode fluorescent lamp 25. The light guide plate 21 has a light exiting side 211, a reflection side 212 opposite to the light exiting side 211, and at least a light entering side 213 at the flank. The reflection plate 22 is attached to the reflection side 212 of the light guide plate 21, and the surface of the reflection side 212 is densely dispersed with light guiding dots 214. The diffusion film 23 and prism sheet 24, on the other hand, are attached to the light exiting side 211 of the light guide plate 21. The lamp 25 is arranged along the light entering side 213 and is wrapped almost completely inside a lamp reflector 26. On the inner side (i.e., the side facing the light guide plate 21) of the lamp reflector 26, there are light guiding devices 27 at the bottom 261 (i.e., adjacent to the reflection side 212) neighboring to the electrodes 252 at the two ends of the tubular body 251 of the lamp 25. On top of the light guiding devices 27, there are inclined reflection surfaces 271 reflecting and directing lights directly toward the corner areas 215 of the light guide plate 21.

When the lamp 25 is conducted with electricity and emits lights, part of the lights enters into the light guide plate 21 directly, and part of lights is reflected by the lamp reflector 26 and then enters into the light guide plate 21, all via the light entering side 213. With the configuration of the light guiding devices 27, part of the lights from the lamp 25 is reflected by the reflection surfaces 271 and is directed toward the corner areas 215 of the light guide plate 21. The corner areas 215 of the light guide plate 21 therefore receive additional lighting from the lamp 25 and the lighting uniformity of the backlight module 2 is greatly enhanced.

In a second embodiment, the light guiding devices 27 are at the top 262 (adjacent to the light exiting side 211) on the inner side of the lamp reflector 26. Similarly, part of the lights from the lamp 25 is reflected by the reflection surfaces 271 and is directed toward the corner areas 215 of the light guide plate 21.

In a third embodiment, the light guiding devices 27 are at both the top 262 and bottom 261 on the inner side of the lamp reflector 26. Compared to the previous embodiments, a larger portion of the lights from the lamp 25 is reflected by the reflection surfaces 271 and is directed toward the corner areas 215 of the light guide plate 21. The corner areas 215 would therefore receive additional lighting in the present embodiment.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. In a corner enhancing device of a backlight module, said backlight module comprising a light guide plate, a reflection plate covering and attaching to a reflection side of said light guide plate, at least a diffusion film and at least a prism sheet covering and stacking on a light exiting side of said light guide plate, a lamp wrapped in an inner side of a lamp reflector and positioned next to a light entering side of said light guide plate, the improvement wherein a light guiding device is positioned at a bottom of said inner side of said lamp reflector neighboring to an electrode at an end of said lamp, and said light guiding device has an inclined reflection surface for reflecting and directing lights emitted from said lamp directly toward a corner area of said light guide plate so as to provide additional lighting to said corner area.

2. In a corner enhancing device according to claim 1, further comprising a second light guiding device positioned at a top of said inner side of said lamp reflector adjacent to said light exiting side of said light guide plate.

* * * * *